(12) United States Patent
Park (10) Patent No.: US 9,731,359 B2
(45) Date of Patent: Aug. 15, 2017

(54) CUTTING INSERT AND CUTTING TOOL INCLUDING THE SAME

(71) Applicant: TAEGUTEC, LTD., Dalseong-gun, Daegu (KR)

(72) Inventor: Chang Gyu Park, Daegu (KR)

(73) Assignee: TAEGUTEC LTD., Dalseong-gun, Daegu (KR)

( * ) Notice: Subject to any disclaimer, the term of this patent is extended or adjusted under 35 U.S.C. 154(b) by 255 days.

(21) Appl. No.: 14/416,224

(22) PCT Filed: Jul. 31, 2013

(86) PCT No.: PCT/KR2013/006887
§ 371 (c)(1),
(2) Date: Jan. 21, 2015

(87) PCT Pub. No.: WO2014/025158
PCT Pub. Date: Feb. 13, 2014

(65) Prior Publication Data
US 2015/0183033 A1   Jul. 2, 2015

(30) Foreign Application Priority Data

Aug. 7, 2012  (KR) .................. 10-2012-0086385

(51) Int. Cl.
*B23C 5/20*   (2006.01)
*B23C 5/10*   (2006.01)

(52) U.S. Cl.
CPC .............. *B23C 5/207* (2013.01); *B23C 5/109* (2013.01); *B23C 2200/0455* (2013.01);
(Continued)

(58) Field of Classification Search
CPC .... B23C 2200/0433; B23C 2200/0494; B23C 2200/208; B23C 5/207
See application file for complete search history.

(56) References Cited

U.S. PATENT DOCUMENTS 3,955,259 A * 5/1976 Gustafsson ............. B23C 5/207
407/113
4,087,192 A  5/1978 Hertel
(Continued)

FOREIGN PATENT DOCUMENTS

CN  1597206  3/2005
DE  29923383  10/2000
(Continued)

OTHER PUBLICATIONS

Japanese Office Action dated Jan. 15, 2016, issued in JP counterpart application (No. 2015-525354).
(Continued)

*Primary Examiner* — Will Fridie, Jr.
(74) *Attorney, Agent, or Firm* — Womble Carlyle (57) ABSTRACT

An indexable cutting insert is suitable for vertical and oblique machining. The cutting insert has top and bottom surfaces, first to fourth side surfaces extending between the top and bottom surfaces, and a screw hole passing through the top and bottom surfaces. The top surface has a mounting surface of a flat surface. The top and bottom surfaces are rotationally symmetric with each other. A cutting edge is formed at a junction between the top surface and the adjacent first and second side surfaces. A non-cutting edge is formed at a junction between the top surface and the adjacent third and fourth side surfaces. The first and second side surfaces form an acute angle with a plane extending from the mounting surface of the top surface. The third and fourth side surfaces form an obtuse angle with the plane extending from the mounting surface of the top surface.

12 Claims, 7 Drawing Sheets

(52) U.S. Cl.
CPC *B23C 2200/0494* (2013.01); *B23C 2210/168* (2013.01); *Y10T 407/2274* (2015.01); *Y10T 407/235* (2015.01); *Y10T 407/24* (2015.01)

(56) References Cited

U.S. PATENT DOCUMENTS

| | | | | |
|---|---|---|---|---|
| 4,090,801 | A * | 5/1978 | Faber | B23C 5/207 407/113 |
| 5,314,269 | A | 5/1994 | Arai et al. | |
| 5,454,670 | A | 10/1995 | Noda et al. | |
| 5,947,650 | A | 9/1999 | Satran et al. | |
| 6,142,716 | A * | 11/2000 | Jordberg | B23C 5/202 407/114 |
| 6,196,770 | B1 * | 3/2001 | Astrom | B23C 5/109 407/114 |
| 6,503,028 | B1 * | 1/2003 | Wallstrom | B23C 5/109 407/35 |
| 6,929,427 | B2 | 8/2005 | Satran | B23C 5/109 407/113 |
| 7,510,353 | B2 * | 3/2009 | Kramer | B23C 5/06 407/113 |
| 8,573,897 | B2 * | 11/2013 | Kim | B23C 5/1045 407/42 |
| 2008/0304924 | A1 | 12/2008 | Engstrom et al. | |
| 2009/0092451 | A1 | 4/2009 | Harif | |
| 2009/0245953 | A1 | 10/2009 | Kramer | |
| 2011/0097164 | A1 | 4/2011 | Choi et al. | |
| 2012/0275868 | A1 | 11/2012 | Saito et al. | |
| 2013/0004382 | A1 | 1/2013 | Chen | |
| 2016/0023285 | A1 * | 1/2016 | Saji | B23C 5/207 407/33 |
| 2016/0214186 | A1 * | 7/2016 | Mura | B23C 5/109 |

FOREIGN PATENT DOCUMENTS

| | | |
|---|---|---|
| JP | U S48-103973 | 12/1973 |
| JP | H06 21607 Y2 | 6/1994 |
| JP | H 11-813 | 6/1997 |
| JP | 2001-328011 | 5/2000 |
| JP | 2006-088284 | 4/2006 |
| KR | 10-2006-0135212 | 12/2006 |
| WO | 2008-132757 | 11/2008 |

OTHER PUBLICATIONS

Chinese Office Action dated Jan. 25, 2016, issued in CN counterpart application (No. 201380041900.4).

European Search Report dated Mar. 1, 2016, issued in EP counterpart application (No. 13827578.9).

Office Action dated Sep. 11, 2015 issued in Japanese counterpart application (No. 2015-525354).

International Search Report in PCT/KR2013/006887, dated Nov. 28, 2013.

* cited by examiner

CUTTING INSERT AND CUTTING TOOL INCLUDING THE SAME

RELATED APPLICATIONS

This is a 35 USC 371 U.S. National Phase of International Application No. PCT/KR2013/006887, filed 31 Jul. 2013 and published in English as WO 2014/025158A1 on 13 Feb. 2014, which claims priority to Korean application no. 10-2012-0086385, filed 7 Aug. 2012. The contents of the aforementioned applications are incorporated by reference in their entirety.

TECHNICAL FIELD

The present invention relates to a cutting insert and a cutting tool including the same. More particularly, the present invention relates to an indexable cutting insert, for example a two-way indexable cutting insert, for vertical machining and oblique machining, which is capable of achieving stability in a machining process, and a cutting tool including such a cutting insert.

BACKGROUND ART

Typically, a cutting tool, in which an indexable cutting insert is mounted, is used for vertical machining of a metal workpiece. There exist in the art various cutting tools for vertical machining, in which an indexable cutting insert is mounted. Conventional cutting tool is configured such that a cutting insert is coupled to a cutter body by means of a screw. Korean Laid-Open Patent Publication No. 2006-0135212 discloses an example of such a conventional cutting tool.

Further, in a conventional cutting insert, a cutting edge for cutting is formed at a top surface, a mounting surface is formed in a bottom surface, and a hole is bored at the center of the mounting surface. In such a conventional cutting insert, a side surface of the cutting insert and the mounting surface of the bottom surface may form an obtuse angle therebetween.

Recently, in the field of metal machining, it has become an important issue to become competitive by effectively controlling the rise in production costs. Further, enhancing productivity is the key factor to becoming competitive. To enhance productivity, a feed per cutting edge during a cutting operation must be increased.

However, when machining a workpiece at a high feed rate for enhancement in productivity using the conventional cutting insert, wherein the side surface and the mounting surface of the bottom surface form an obtuse angle, the cutting force generated during machining may break the screw. It may cause not only the breakage of the screw, but also the separation of the cutting insert, the damage of the cutter body, and the damage of the workpiece, thereby leading to serious problems. The breakage and damage become more crucial in cases where reliability of cutting is important (e.g., when machining expensive parts for an aircraft).

DISCLOSURE OF INVENTION

Technical Problem

The present invention is directed to solving the aforementioned problems of the prior art. Accordingly, the present invention provides a cutting insert and a cutting tool for vertical machining and oblique machining, which is capable of improving cutting productivity and achieving stability in a machining process.

Solution to Problem

One aspect of the present invention relates to a cutting insert for vertical machining and oblique machining. In an exemplary embodiment, a cutting insert comprises a top surface, a bottom surface, first to fourth side surfaces extending between the top and bottom surfaces, and a screw hole extending through the top and bottom surfaces. The top surface includes a mounting surface comprising a flat surface. The top and bottom surfaces are rotationally symmetric with each other. A cutting edge is formed at a junction between the top surface and the first and second side surfaces, which are adjacent to each other. A non-cutting edge is formed at a junction between the top surface and the third and fourth side surfaces, which are adjacent to each other. The first and second side surfaces form an acute angle with a plane extending from the mounting surface of the top surface. The third and fourth side surfaces form an obtuse angle with the plane extending from the mounting surface of the top surface.

The bottom surface may include a mounting surface comprising a flat surface. An angle formed between the first side surface and the plane extending from the mounting surface of the top surface may be equal to an angle formed between the fourth side surface and a plane extending from the mounting surface of the bottom surface. An angle formed between the second side surface and the plane extending from the mounting surface of the top surface may be equal to an angle formed between the third side surface and the plane extending from the mounting surface of the bottom surface.

The acute angle formed between the first and second side surfaces and the plane extending from the mounting surface of the top surface may be 75° to 85°.

A distance from the mounting surface of the bottom surface to the cutting edge located at the top surface may be greater than a distance from the mounting surface of the bottom surface to the mounting surface of the top surface.

A rake surface may be formed between the cutting edge and the mounting surface of the top surface.

A first main cutting edge may be formed at a junction between the top surface and the first side surface. A first corner cutting edge may be formed at a corner between the first side surface and the second side surface. The second side surface may comprise a plurality of surfaces. A first wiper cutting edge may be formed at a junction between the top surface and a surface among the plurality of surfaces of the second side surface, which is adjacent to the first side surface. A first oblique cutting edge may be formed at a junction between the top surface and a surface among the plurality of surfaces of the second side surface, which is adjacent to the third side surface. A second main cutting edge may be formed at a junction between the bottom surface and the fourth side surface. A second corner cutting edge may be formed at a corner between the third side surface and the fourth side surface. The third side surface may comprise a plurality of surfaces. A second wiper cutting edge may be formed at a junction between the bottom surface and a surface among the plurality of surfaces of the third side surface, which is adjacent to the fourth side surface. A second oblique cutting edge may be formed at a junction between the bottom surface and a surface among the plurality of surfaces of the third side surface, which is adjacent to the second side surface.

The first main cutting edge may be inclined downwardly from a first corner cutting edge. The first wiper cutting edge may be parallel to the mounting surface of the top surface. The first oblique cutting edge may be inclined downwardly from the first wiper cutting edge. The second main cutting edge may be inclined upwardly from the second corner cutting edge. The second wiper cutting edge may be parallel to the mounting surface of the bottom surface. The second oblique cutting edge may be inclined upwardly from the second wiper cutting edge.

The cutting edge may comprise a main cutting edge and a wiper cutting edge. An angle formed between the first side surface with the main cutting edge and the second side surface with the wiper cutting edge may be 85° to 95°.

The first side surface may comprise a first relief surface, which is adjacent to the top surface and comprises a convex curved surface, and a second relief surface that is adjacent to the bottom surface and comprises a flat surface. The fourth side surface may comprise a first relief surface, which is adjacent to the bottom surface and comprises a convex curved surface, and a second relief surface that is adjacent to the top surface and comprises a flat surface.

The top surface and the bottom surface may be rotationally symmetric with respect to a central line parallel to a line that extends through centers of connection edges formed between the cutting edge and the non-cutting edge. In this case, the central line may extend through a center of a corner located between the adjacent second and third side surfaces and a center of a corner located between the adjacent first and fourth side surfaces.

The cutting edge may comprise a first cutting edge located at the top surface and a second cutting edge located at the bottom surface. The first cutting edge may be formed at a junction between the top surface and the first and second side surfaces and the second cutting edge may be formed at a junction between the bottom surface and the third and fourth side surfaces. The first cutting edge and the second cutting edge may be symmetric with respect to the central line.

A further aspect of the present invention provides a cutting tool for vertical machining and oblique machining. In an exemplary embodiment, a cutting tool comprises the above-described cutting insert and an insert pocket in which the cutting insert is mounted. The insert pocket comprises an insert seating surface, on which the cutting insert is seated, and radial and axial support walls contacting the side surfaces of the cutting insert and supporting the cutting insert. The insert seating surface and the radial support wall form an acute angle and the insert seating surface and the axial support wall form an acute angle.

Advantageous Effects of Invention

The cutting insert according to the embodiment can be stably mounted in the cutting tool to thereby prevent the breakage of the screw and the cutting insert, as well as the damage of a workpiece resulting therefrom during a cutting operation. Thus, the reliability of a tool service life and the cutting productivity can be improved.

Further, the cutting insert according to the embodiment has one main cutting edge at the top surface and another one main cutting edge at the bottom surface. Thus, an unused cutting edge can be prevented from being damaged by chips generated during cutting operation.

Furthermore, the cutting insert and the cutting tool according to the embodiment can be used for vertical machining and oblique machining. The cutting insert and the cutting tool according to the embodiment can be used in various machining fields such as machining of parts for a mold, parts for a vehicle, etc.

MODE FOR THE INVENTION

Embodiments of the present invention will now be described with reference to the accompanying drawings. Like components are denoted by like reference numerals in the drawings. Further, the size of each component shown in the drawings is arbitrary for ease of description and the present invention should not be limited to the depiction shown in the drawings.

Figure 1:
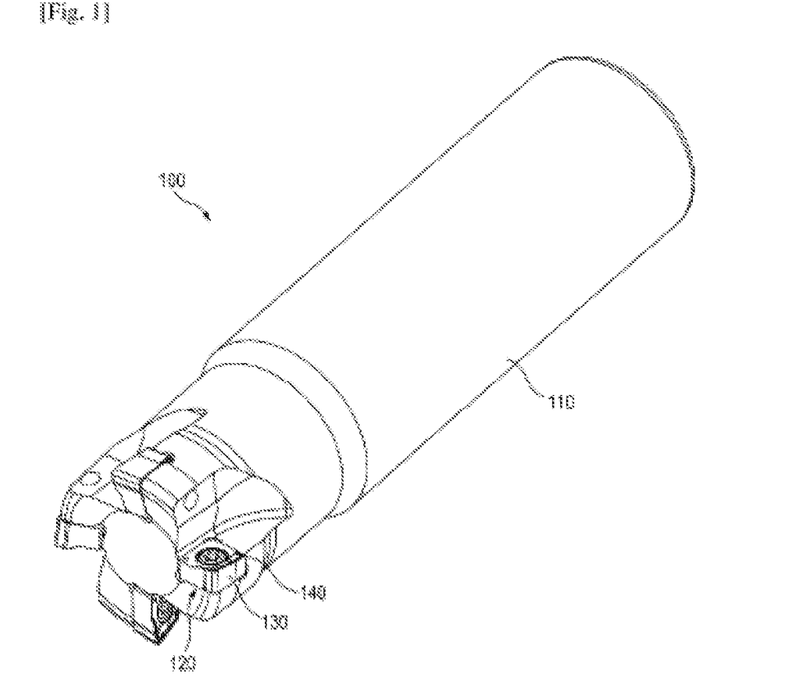
FIG. 1 is a perspective view of a cutting tool according to one embodiment of the present invention.

FIG. 1 is a perspective view showing a cutting tool according to one embodiment of the present invention. The cutting tool 100 according to one embodiment may be used for vertical machining and oblique machining. Referring to FIG. 1, the cutting tool 100 comprises a cutter body 110 and a plurality of cutting inserts 130. The cutting insert 130 is replaceably mounted in the cutter body 110. Specifically, the cutting insert 130 is secured to an insert pocket 120 of the cutter body 110 by means of a screw 140.

FIGS. 2 to 5 are a perspective view, a front view, a bottom view and a left side view of the cutting insert 130 according to a first embodiment of the present invention, respectively. FIG. 6 is a sectional view taken along the line VI-VI of FIG. 4, where line VI-VI represents the mid-plane of the cutting insert 130. Detailed descriptions will be made below as to the cutting insert according to the first embodiment with reference to FIGS. 2 to 6.

The cutting insert 130 comprises a top surface 131, a bottom surface 132 and a side surface 133 extending between the top surface 131 and the bottom surface 132. In this embodiment, the side surface 133 of the cutting insert 130 comprises four side surfaces, i.e., a first side surface 133*a*, a second side surface 133*b*, a third side surface 133*c* and a fourth side surface 133*d*. Each of the first to fourth side surfaces 133*a*, 133*b*, 133*c* and 133*d* is inclined with respect to the top surface 131 and the bottom surface 132.

The top surface 131 is formed with a mounting surface 131*a* that abuts an insert seating surface of the insert pocket 120. The mounting surface 131*a* comprises a flat surface. A screw hole 138, to which the screw 140 is inserted to mount the cutting insert 130 to the insert pocket 120, extends from a central portion of the mounting surface 131*a* toward the bottom surface 132 as passing through the cutting insert 130. A cutting edge 134 is formed at a junction between the top surface 131 and the first and second side surfaces 133*a*, 133*b*. A rake surface 131*b* is formed between the mounting surface 131*a* and the cutting edge 134, thus facilitating the discharge of chips and achieving a small cutting resistance. Further, a non-cutting edge 135 is formed at a junction between the top surface 131 and the third side surface 133*c* as well as at a junction between the top surface 131 and the fourth side surface 133*d*. A connection edge 136 is formed in a corner of the top surface 131 through which the cutting edge 134 and the non-cutting edge 135 are connected to each other.

Figure 2:
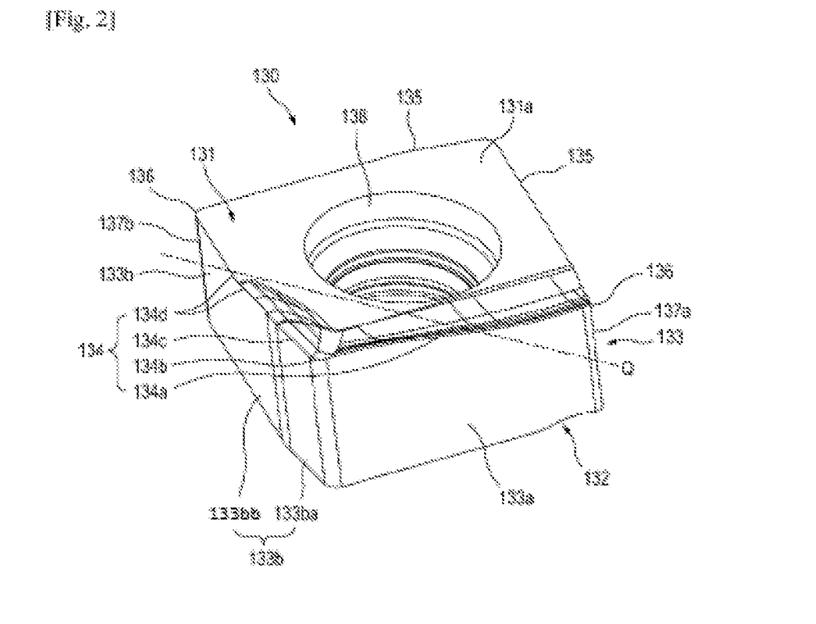
FIG. 2 is a perspective view of a cutting insert according to a first embodiment of the present invention.
Figure 3:
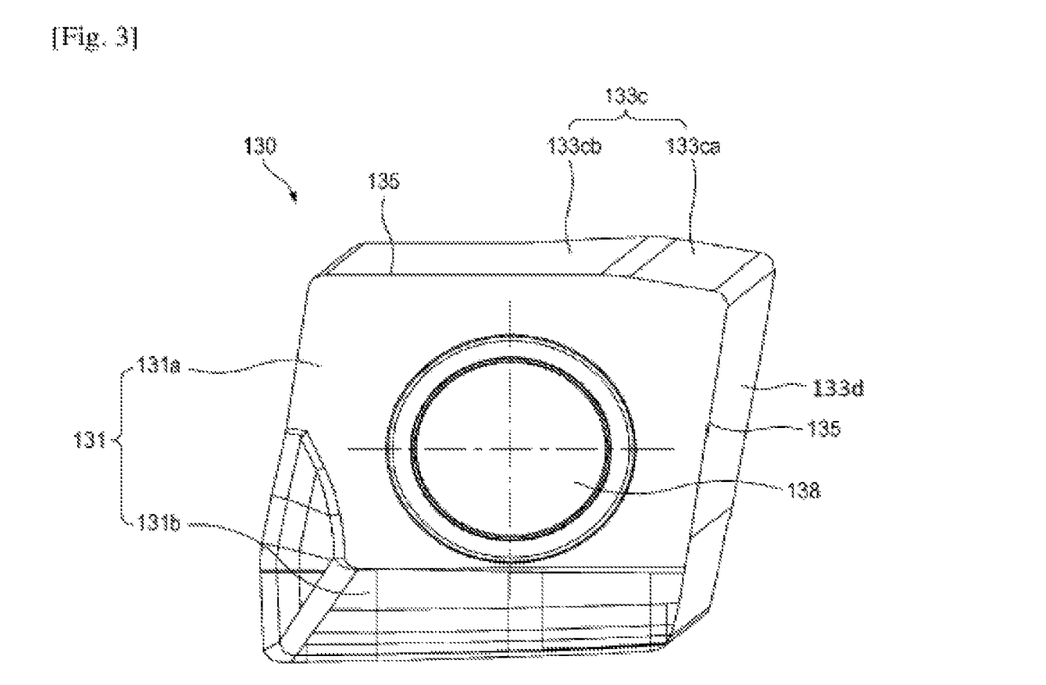
FIG. 3 is a front view of a cutting insert according to a first embodiment of the present invention.

Referring to FIG. 2, the cutting edge 134 comprises a main cutting edge 134*a*, a corner cutting edge 134*b*, a wiper cutting edge 134*c* and an oblique cutting edge 134*d*. The main cutting edge 134*a* is formed at the junction between the top surface 131 and the first side surface 133*a*. The wiper cutting edge 134*c* and the oblique cutting edge 134*d* are formed at the junction between the top surface 131 and the second side surface 133*b*. Specifically, the second side surface 133*b* comprises a plurality of surfaces. The wiper cutting edge 134*c* is formed at the junction between the top surface 131 and a surface 133*ba* of the plurality of surfaces of the second side surface 133*b* adjacent to the first side surface 133*a*. The oblique cutting edge 134*d* is formed at the junction between the top surface 131 and a surface 133*bb* of the plurality of surfaces of the second side surface 133*b* adjacent to the third side surface 133*c*. The main cutting edge 134*a*, the corner cutting edge 134*b* and the wiper cutting edge 134*c* are positioned higher than the mounting surface 131*a* of the top surface 131. The wiper cutting edge 134*c* may be positioned approximately parallel to the mounting surface 131*a* to provide a workpiece with an excellent surface roughness. The main cutting edge 134*a* is downwardly inclined from the corner cutting edge 134*b*. The main cutting edge 134*a* may comprise a plurality of straight lines or curved lines. The oblique cutting edge 134*d* is downwardly inclined from the wiper cutting edge 134*c*. The oblique cutting edge 134*d* may comprise a plurality of straight lines or curved lines.

The cutting insert 130 of this embodiment is configured to be rotationally symmetric with respect to an imaginary central line Q. The central line Q is parallel to a line that extends through centers of the connection edges 136 connecting the cutting edge 134 and the non-cutting edges 135. In this embodiment, the central line Q extends through a center of a corner portion 137*b* located between the second side surface 133*b* and the third side surface 133*c* as well as a center of a corner portion 137*a* located between the first side surface 133*a* and the fourth side surface 133*d*. Accordingly, the top surface 131 and the bottom surface 132 are rotationally symmetric relative to each other. Thus, the bottom surface 132 has the same shape as the top surface 131 through the 180 degree rotationally symmetric configuration of the cutting insert 130 with respect to the central line Q. Therefore, the mounting surface and the rake surface are also formed at the bottom surface 132. Further, the cutting edge and the non-cutting edge are also formed at the junctions between the bottom surface 132 and the side surface 133. Specifically, the main cutting edge is formed at the junction between the bottom surface 132 and the fourth side surface 133*d*. The third side surface 133*c* also comprises a plurality of surfaces. The wiper cutting edge is also formed at the junction between the bottom surface 132 and a surface 133*ca* of the plurality of surfaces of the third side surface 133*c* adjacent to the fourth side surface 133*d*. The oblique cutting edge is also formed at the junction between the bottom surface 132 and a surface 133*cb* of the plurality of surfaces of the third side surface 133*c* adjacent to the second side surface 133*b*. As a result, the cutting edge 134 along the top surface 131 is diagonally opposite cutting edge along the bottom surface 132. Similarly, the above described configuration results in the top and bottom surfaces 131, 132 being identical to one another, the first and fourth side surfaces 133*a*, 133*d* being identical to one another, and the second and third side surfaces 133*b*, 133*c* being identical to one another.

As such, the cutting insert 130 has the rotational symmetry configuration with respect to the central line Q and one cutting edge is formed at each of the top surface 131 and the bottom surface 132. Thus, the cutting insert 130 can be used in such a manner that the top surface 131 is reversed to the bottom surface 132 or vice versa.

According to the cutting insert 130 of this embodiment, as described above, the side surface 133 is inclined with respect to the top surface 131 and the bottom surface 132. Specifically, the first side surface 133*a* and the second side surface 133*b*, which are adjacent to the cutting edge 134, form an acute angle with a top plane defined by and containing the mounting surface 131*a* of the top surface 131, respectively. The third side surface 133*c* and the fourth side surface 133*d* form an acute angle with a bottom plane defined by and containing the mounting surface 132*a* of the bottom surface 132, respectively. Further, the degree of the angle, which the first side surface 133*a* forms with the top plane of the mounting surface 131*a* of the top surface 131, is equal to the degree of the angle, which the fourth side surface 133*d* forms with the bottom plane of the mounting surface 132*a* of the bottom surface 132. Also, the degree of the angle, which the second side surface 133*b* forms with the top plane of the mounting surface 131*a* of the top surface 131, is equal to the degree of the angle, which the third side surface 133*c* forms with the bottom plane of the mounting surface 132*a* of the bottom surface 132.

If said acute angle is too small, then a portion to be cut becomes too acute when the cutting edge is used. This may lead to the strength deterioration of the cutting insert. For this reason, in this embodiment, the angle, which the first side surface 133*a* and the second side surface 133*b* form with the plane extending from the mounting surface 131*a* of the top surface 131, is in the range of about 75° to about 85°. Further, the angle α which the third side surface 133*c* and the fourth side surface 133*d* form with the plane extending from the mounting surface 132*a* of the bottom surface 132 (see FIG. 4), is equal to said angle which the first side surface 133a and the second side surface 133b form with the plane extending from the mounting surface 131a of the top surface 131.

Further, the third side surface 133c and the fourth side surface 133d, which are adjacent to the non-cutting edge 135, form an obtuse angle with the top plane of the mounting surface 131a of the top surface 131, respectively. Also, the first side surface 133a and the second side surface 133c form an obtuse angle with the bottom plane of the mounting surface 132a of the bottom surface 132, respectively. With this configuration, the cutting insert 130 can be stably supported by the insert pocket 120 of the cutter body 110 while contacting the insert pocket 120. Thus, the abnormal breakage of the screw caused by the cutting force during cutting operation can be prevented and stronger cutting can be achieved. As said obtuse angle becomes larger, the breakage caused by the cutting force can be prevented as much.

Figure 4:
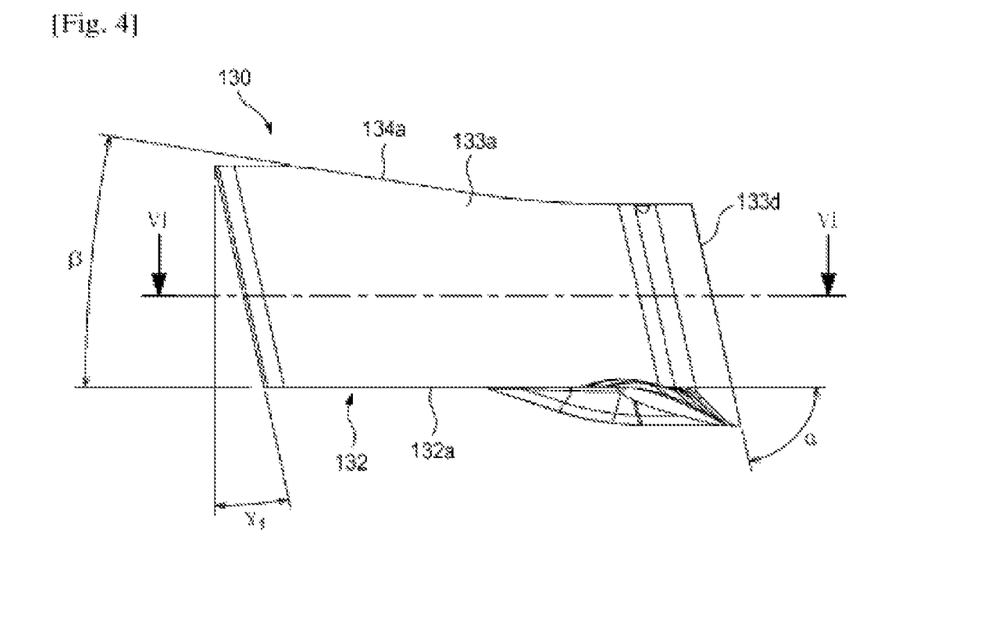
FIG. 4 is a bottom view of a cutting insert according to a first embodiment of the present invention.
Figure 5:
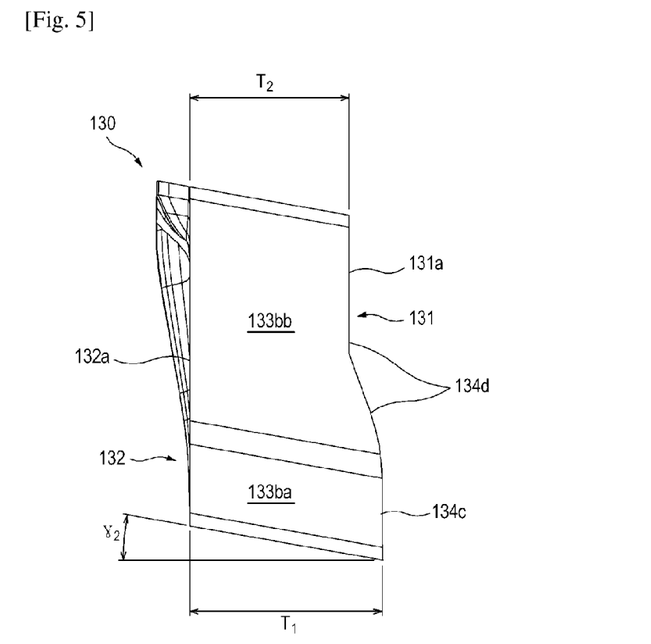
FIG. 5 is a left side view of a cutting insert according to a first embodiment of the present invention.
Figure 6:
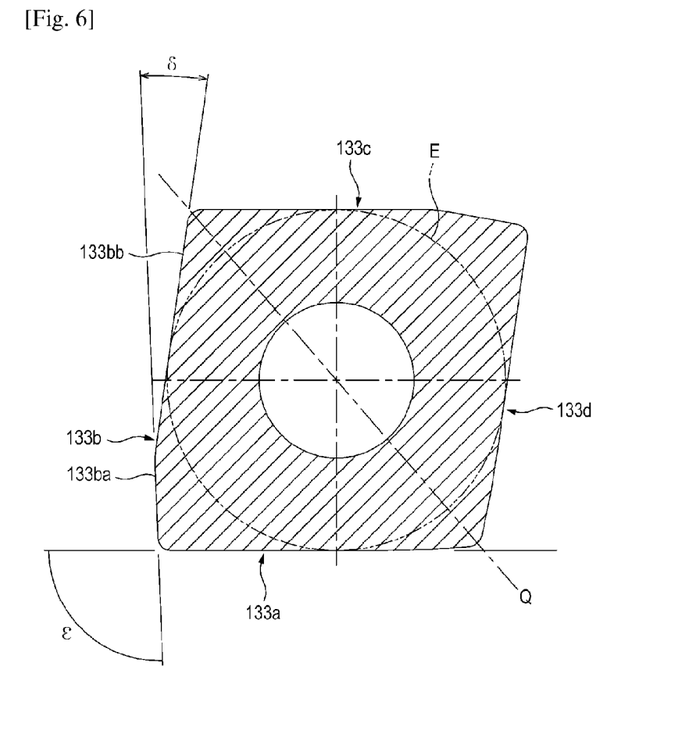
FIG. 6 is a sectional view taken along the line VI-VI of FIG. 4.

Referring to FIGS. 4 and 5, the mounting surface 131a of the top surface 131 and the mounting surface of the bottom surface 132 are parallel to each other. The cutting edge adjacent to the top surface 131 protrudes over the mounting surface 131a of the top surface 131 and the cutting edge adjacent to the bottom surface 132 protrudes over the mounting surface 132a of the bottom surface 132. That is, the cutting insert 130 is configured such that a first thickness $T_1$ (distance between the mounting surface 132a of the bottom surface 132 and the cutting edge located at the top surface) is greater than a second thickness $T_2$ (distance between the mounting surface of the bottom surface and the mounting surface of the top surface). This is to secure a space for the smooth discharge of the chips produced by the main cutting edge during cutting operation, as described above. Where the chips are not smoothly discharged, the chips may cause excessive friction heat, vibration, noise, etc., and further obstruct cutting action as intervened between the cutting edge and the workpiece. However, this embodiment eliminates any interference from a chip discharge path through the above-described configuration, thus enabling not only the smooth discharge of the chips, but also effective cutting.

A rake angle $\beta$ between the mounting surface and the cutting edge shown in FIG. 4 forms an axial cutting edge angle together with an axial rake angle formed by a rotation axis RA (see FIG. 9) of the cutting tool 100 and an insert seating surface 121 (see FIG. 9) of the insert pocket 120, when the cutting insert 130 is mounted in the cutter body 110. Considering that a large axial cutting edge angle reduces a cutting resistance as well as a cutting impact force exerted to the cutting edge, said rake angle $\beta$ may be as large as possible. In this embodiment, considering the strength, thickness, etc. of the cutting insert 130, said rake angle $\beta$ is in the range of about 5° to about 15°.

An angle $\gamma_1$ shown in FIG. 4 and an angle $\gamma_2$ shown in FIG. 5 indicate relief angles of the cutting edge 134 of the cutting insert 130. Considering the strength of the cutting edge, the relief angle $\gamma_2$ of the main cutting edge 134a should not be too large. In this embodiment, the relief angle $\gamma_2$ of the main cutting edge 134a is in the range of about 5° to about 30°, preferably about 5° to about 15°. The relief angle $\gamma_1$ of the wiper cutting edge 134c should also not be large when considering the strength of the cutting edge. In this embodiment, the relief angle $\gamma_1$ of the wiper cutting edge 134c is in the range of about 5° to about 20°. The cutting insert 130 having the above-described the relief angle $\gamma_2$ of the main cutting edge 134a and the above-described relief angle $\gamma_1$ of the wiper cutting edge 134c is mounted in the cutter body 110 at the axial rake angle of about 3° to about 15°.

Referring to FIG. 6, an intermediate sectional shape of the cutting insert 130 is an approximately parallelogramic shape. As shown in FIG. 6, an imaginary circle E may be inscribed with each of the side surfaces at four points.

The first side surface 133a with the main cutting edge 134a and the second side surface 133b with the wiper cutting edge 134c form an angle $\epsilon$ shown in FIG. 6. In this embodiment, the angle $\epsilon$ is in the range of about 85° to about 95°. By forming the angle $\epsilon$ of the above range, vertical machining can be performed by the cutting insert 130 mounted in the cutter body 110. Further, a rake angle $\delta$ at which the surface 133bb of the second side surface 133b with the oblique cutting edge 134d is inclined relative to the surface 133ba of the second side surface 133b with the wiper cutting edge 134c, is necessary for oblique machining. Where said rake angle $\delta$ is 0°, it is difficult to secure a space for forming the oblique cutting edge necessary for the oblique machining and thereby oblique machining may be restricted substantially. On the contrary, too large rake angle $\delta$ may cause unstable mount of the cutting insert at its side surface or decrease in a resistive force against a radial cutting force during cutting operation. Therefore, in this embodiment, to efficiently perform the oblique machining, said rake angle $\delta$ is in the range of about 3° to about 30°, preferably about 5° to about 15°.

Figure 7:
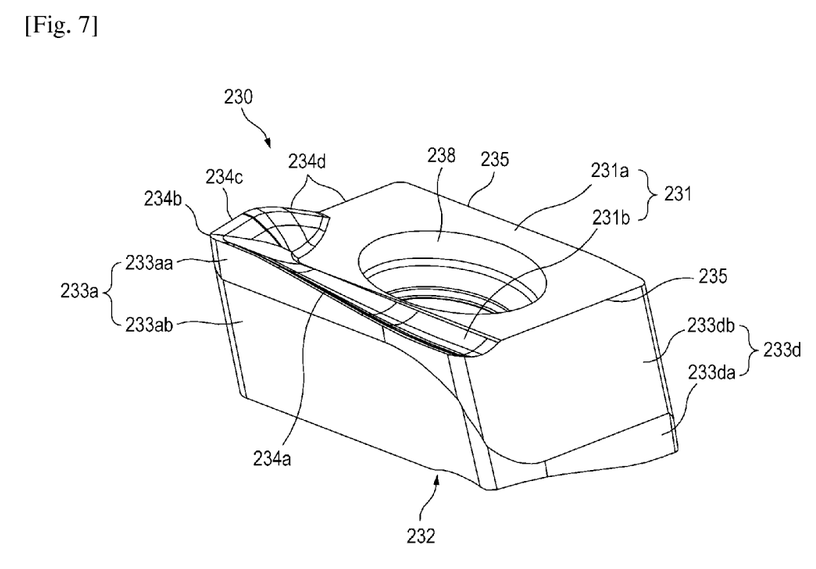
FIG. 7 is a perspective view of a cutting insert according to a second embodiment of the present invention.

FIG. 7 is a perspective view showing a cutting insert according to a second embodiment of the present invention.

The cutting insert 230 according to the second embodiment of the present invention comprises a top surface 231, a bottom surface 232 and four side surfaces extending between the top surface 231 and the bottom surface 232. The top surface 231 comprises a mounting surface 231a, which comprises a flat surface, and a rake surface 231b inclined toward a main cutting edge 234a. Similar to the cutting insert 130 of the first embodiment, the cutting insert 230 of this embodiment is configured to be rotationally symmetric. Thus, the top surface 231 and the bottom surface 232 have the same shape. A first side surface 233a and a second side surface, which form a cutting edge 234a, 234b, 234c, 234d together with the top surface 231, form an acute angle with the mounting surface 231a of the top surface 231. A third side surface and a fourth side surface 233d, which form a non-cutting edge 235 together with the top surface 231, form an obtuse angle with the mounting surface 231a of the top surface 231.

Further, in the cutting insert 230 of this embodiment, each of the first side surface 233a and the fourth side surface 233d comprises two relief surfaces. A first relief surface 233aa of the first side surface 233a, which is adjacent to the top surface 231, is formed in the shape of a convex curved surface, while a second relief surface 233ab of the first side surface 233a, which is adjacent to the bottom surface 232, is formed in the shape of a flat surface. Further, a first relief surface 233da of the fourth side surface 233d, which is adjacent to the bottom surface 232, is formed in the shape of a convex curved surface, while a second relief surface 233db of the fourth side surface 233d, which is adjacent to the top surface 231, is formed in the shape of a flat surface. By forming the first relief surfaces 233aa, 233da in the shape of a convex curved surface, the main cutting edge 234a is positioned in a helical shape when the cutting insert 230 is mounted in the insert pocket 120, thus enhancing the diametrical precision of the workpiece. By forming the second relief surfaces 233ab, 233db in the shape of a flat surface, the cutting insert 230 can be readily mounted in the insert pocket 120. Further, in this embodiment, the relief angle of the main cutting edge 234a is greater than the relief angle of the wiper cutting edge 234c. Thus, the degree of freedom in shape can be raised.

Figure 8:
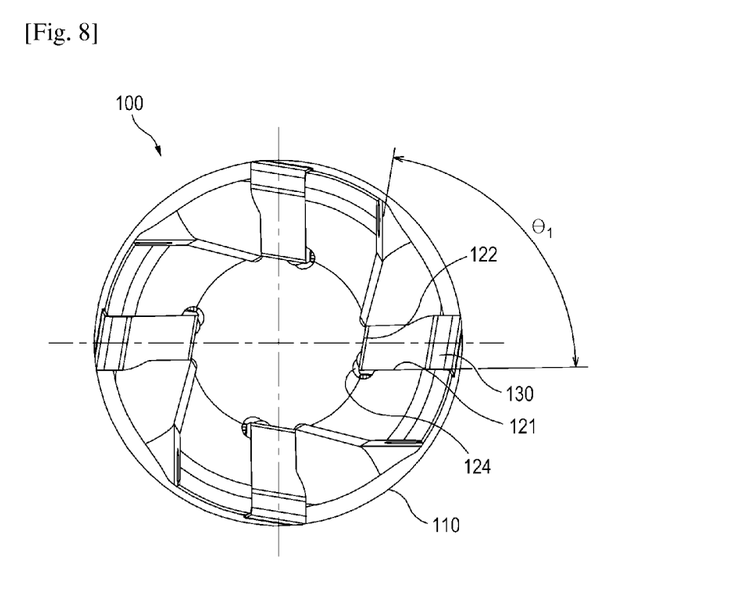
FIG. 8 is a side view of a cutting tool in which a cutting insert according to one embodiment of the present invention is mounted.
Figure 9:
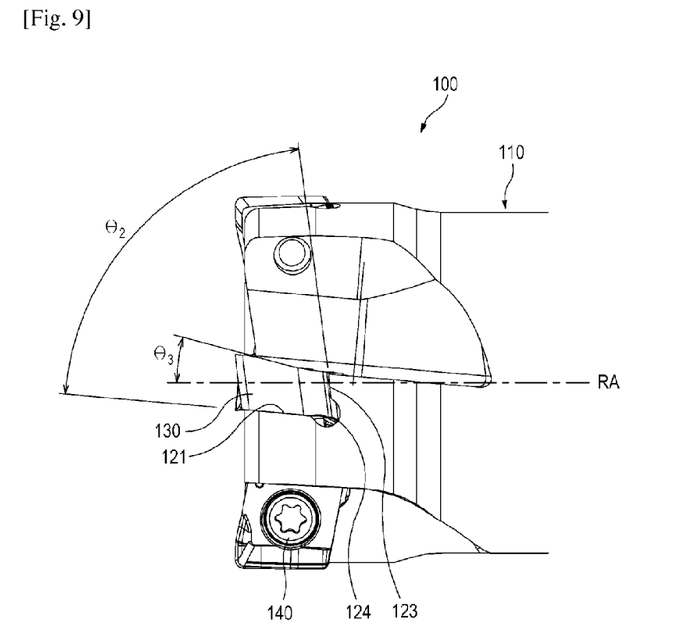
FIG. 9 is a front view of a cutting tool in which a cutting insert according to one embodiment of the present invention is mounted.

FIGS. 8 and 9 are a side view and a front view showing the cutting tool according to one embodiment of the present invention, respectively. Descriptions will be made below as to the cutting tool 100 with the above-described cutting insert 130 mounted therein, particularly the mounting configuration for the cutting insert 130 with reference to FIGS. 8 and 9.

The insert pocket 120 of the cutting tool 100 has a shape inclined in radial and axial directions, such that its shape corresponds to the shape of the above-described cutting insert 130, 230. Specifically, referring to FIG. 8, an insert seating surface 121 and a radial support wall 122 of the insert pocket 120 form an acute angle $\theta_1$ therebetween. The bottom surface 132 of the cutting insert 130 is seated on the insert seating surface 121. The side surface of the cutting insert 130 abuts the radial support wall 122 and is supported thereby. Further, referring to FIG. 9, the insert seating surface 121 and an axial support wall 123 of the insert pocket 120 form an acute angle $\theta_2$ therebetween. Another side surface of the cutting insert 130 abuts the axial support wall 123 and is supported thereby. Explanation will be made below as to why the radial pocket angle $\theta_1$ and the axial pocket angle $\theta_2$ are an acute angle.

Figure 10:
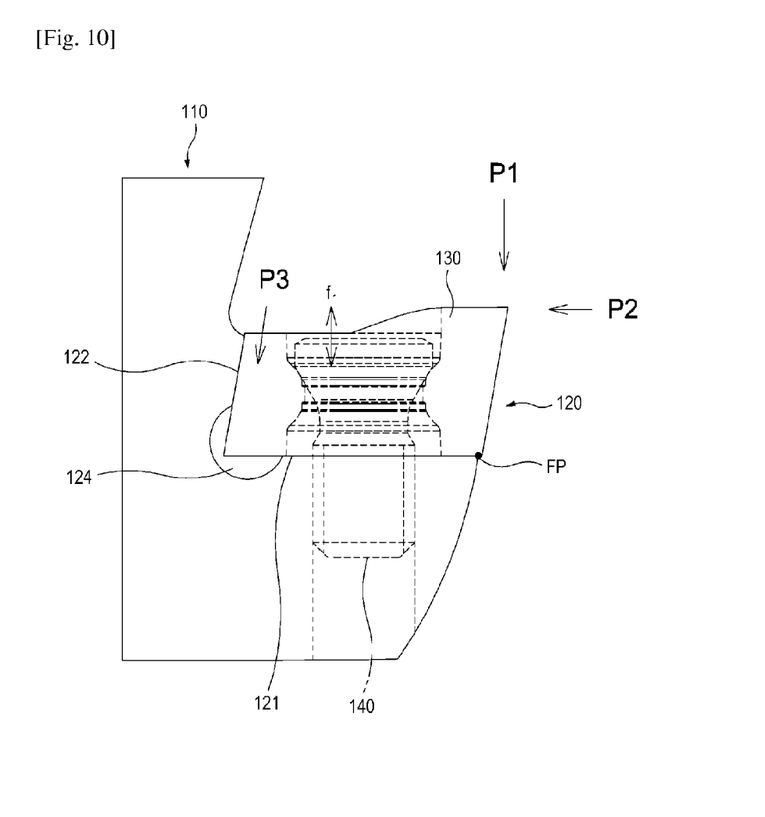
FIG. 10 shows that a cutting insert according to one embodiment of the present invention is mounted in an insert pocket and further shows the forces applied to the cutting insert according to one embodiment.
Figure 11:
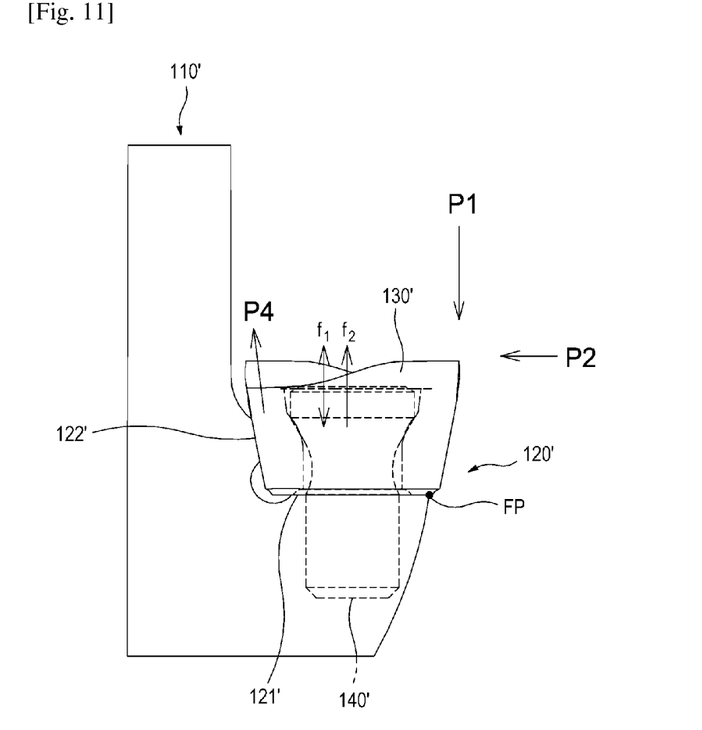
FIG. 11 shows that a cutting insert according to a comparative example is mounted in an insert pocket and further shows the forces applied to the cutting insert according to a comparative example.

FIG. 10 shows forces applied to the cutting insert 130 according to one embodiment of the present invention in the state where the cutting insert 130 is mounted in the insert pocket 120. FIG. 11 shows forces applied to a cutting insert 130' according to a comparative example in the state where the cutting insert 130' is mounted in an insert pocket 120'. Referring to FIGS. 10 and 11, a tensile force $f_1$ is generated in the screw 140, 140' due to a clamping force that is applied when mounting the cutting insert 130, 130' in the insert pocket 120, 120' of the cutter body 110, 110'. Further, the cutting insert 130, 130' is subjected to a rotation force that is generated by a principal cutting force $P_1$ and a radial force $P_2$ among the cutting force components in cutting operation and acts around a fulcrum point FP.

If the insert seating surface 121' and the radial support wall 122' form an obtuse angle therebetween in the insert pocket 120' according to the comparative example shown in FIG. 11, then the cutting insert 130' is subjected to a force $P_4$, which pushes up the cutting insert 130' from the insert pocket 120', due to said rotation force. Therefore, an additional tensile force $f_2$ is applied to the screw 140' in addition to the tensile force $f_1$ applied already. This may cause unexpected breakage to the screw 140'. Such breakage of the screw 140' may sequentially cause the separation of the cutting insert 130', the breakage of the cutter body 110' and the damage of the workpiece.

According to this embodiment, however, the insert seating surface 121 and the radial support wall 122 of the insert pocket 120 form an acute angle therebetween as shown in FIG. 10. Therefore, the principal cutting force $P_1$ and the radial force $P_2$ among the cutting force components in cutting operation generates a force $P_3$ pushing the cutting insert 130 toward the inside of the insert pocket 120. This relieves the tensile force $f_1$ applied to the screw 140. Consequently, the screw 140 is allowed to play a role of only fixing the cutting insert 130, thus avoiding the abnormal breakage.

In the insert pocket 120 of the cutting tool 100 according to this embodiment, the radial pocket angle $\theta_1$ and the axial pocket angle $\theta_2$ have an acute angle ranging from about 75° to about 85°. The range of the radial pocket angle $\theta_1$ and the axial pocket angle $\theta_2$ is determined, considering that the cutting insert 130 can be more stably inserted to the insert pocket 120 at a smaller rake angle and the effect of preventing the breakage caused by the cutting force can be enhanced accordingly.

Referring to FIG. 9, the rake angle β which is between the mounting surface 131a of the top surface 131 of the cutting insert 130 and the cutting edge 134, and an angle, which the insert seating surface 121 of the insert pocket 120 forms relative to a rotation axis RA of the cutting tool 100, define the angle of the cutting edge in the axial direction, i.e., the axial cutting edge angle $\theta_3$. The axial cutting edge angle $\theta_3$ is an important factor in deciding cutting property. A large axial cutting edge angle $\theta_3$ can significantly reduce noise, vibration, etc. and further reduce a cutting load, thus enabling smooth cutting. However, as described above, the range of the rake angle β of the rake surface must be decided considering the indexable configuration for the cutting insert, that is, the replaceablity of the cutting insert. In this embodiment, the axial cutting edge angle $\theta_3$ is in the range of about 5° to about 25°.

Further, a relief groove 124 is formed between the insert seating surface 121 and the radial support wall 122 as well as between the insert seating surface 121 and the axial support wall 123. An unused cutting edge of the cutting insert 130 does not contact the cutter body 110 due to the relief groove 124 and is maintained without any damage. Thus, the cutting insert 130 can be used in such a manner that its mount position is reversed.

As described above, according to the embodiments of the present invention, the cutting insert is formed in the shape of a dovetail and the insert pocket of the cutting tool is formed to correspond to the shape of the cutting insert. Accordingly, the cutting insert can be stably supported in the axial and radial directions of the cutting tool during cutting operation. Further, the breakage of the screw and the cutting insert, and the breakage of the workpiece resulting therefrom can be prevented and thereby the cutting operation can be stably performed. Further, the cutting insert is configured to be rotationally symmetric with respect to the central line. Thus, when the cutting edge located at the top surface is damaged, the cutting operation can be performed using the cutting edge located at the bottom surface without the replacement of the cutting insert.

Figure 12:
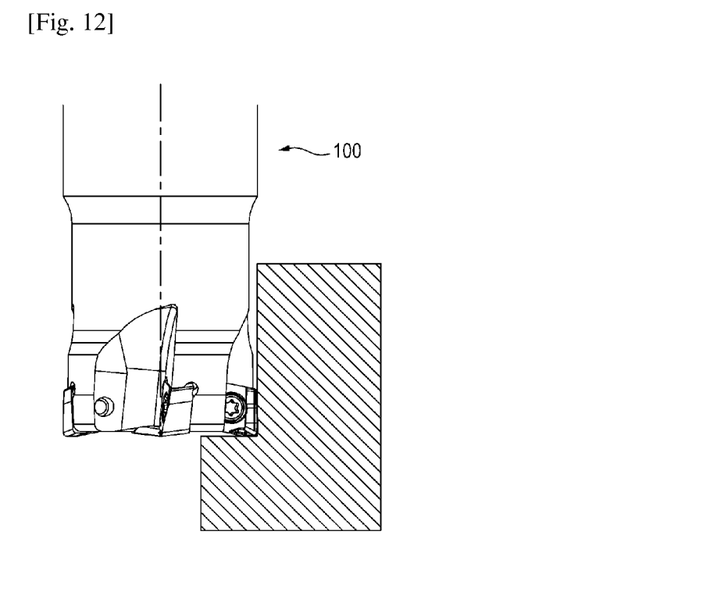
FIG. 12 shows vertical machining performed using a cutting tool according to one embodiment of the present invention.
Figure 13:
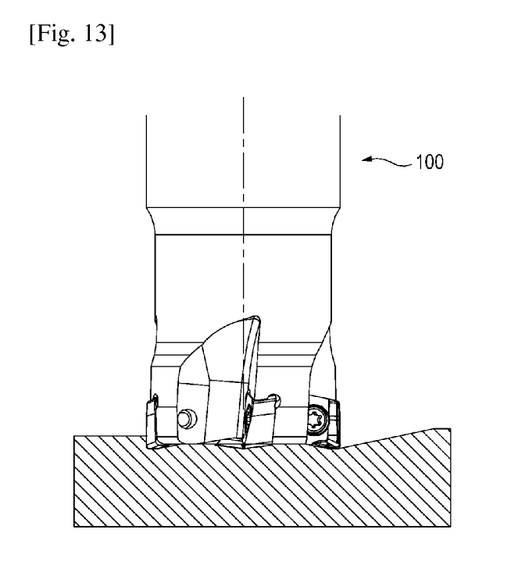
FIG. 13 shows oblique machining performed using a cutting tool according to one embodiment of the present invention.

FIGS. 12 and 13 show vertical machining and oblique machining, which are performed using the cutting tool according to the embodiment of the present invention, respectively. The cutting insert according to the embodiment can perform the vertical machining by means of the main cutting edge (see FIG. 12). Further, the cutting insert according to the embodiment can perform the oblique machining by means of the oblique cutting edge (see FIG. 13).

While the present invention has been described by way of the foregoing embodiments, the present invention should not be limited thereto. The scope of the present invention should be defined by the appended claims. It will be readily understood by those of ordinary skill in the art that various alternations and modifications may be made without departing from the concept and scope of the appended claims.

The invention claimed is:
1. An indexable cutting insert, comprising:
   a top surface;
   a bottom surface;
   first to fourth side surfaces extending between the top surface and the bottom surface; and a screw hole passing through the top surface and the bottom surface, wherein the top surface includes a mounting surface comprising a flat surface, and the top surface and the bottom surface are rotationally symmetric with each other, wherein a first cutting edge is formed at a junction between the top surface and the first and second side surfaces, the first and second side surfaces being adjacent to each other, wherein a second cutting edge is formed at a junction between the bottom surface and the third and fourth side surfaces, the third and fourth side surfaces being adjacent to each other, and the second cutting edge being diagonally opposite the first cutting edge, wherein a first non-cutting edge is formed at a junction between the top surface and the third and fourth side surfaces, the third and fourth side surfaces being adjacent to each other, and wherein the first and second side surfaces form an acute angle with a plane containing the flat mounting surface of the top surface, and the third and fourth side surfaces form an obtuse angle with the plane containing the flat mounting surface of the top surface.

2. The cutting insert of claim 1, wherein the bottom surface includes a mounting surface comprising a flat surface, wherein an angle formed between the first side surface and the plane containing the flat mounting surface of the top surface is equal to an angle formed between the fourth side surface and a plane containing the flat mounting surface of the bottom surface, and wherein an angle formed between the second side surface and the plane containing the flat mounting surface of the top surface is equal to an angle formed between the third side surface and the plane containing the flat mounting surface of the bottom surface.

3. The cutting insert of claim 1, wherein the acute angle formed between the first and second side surfaces and the plane containing the flat mounting surface of the top surface is 75° to 85°.

4. The cutting insert of claim 1, wherein the bottom surface includes a mounting surface comprising a flat surface, and wherein a distance from the mounting surface of the bottom surface to the first cutting edge located at the top surface is greater than a distance from the mounting surface of the bottom surface to the mounting surface of the top surface.

5. The cutting insert of claim 4, wherein a rake surface is formed between the first cutting edge and the mounting surface of the top surface.

6. A cutting insert, comprising:
a top surface;
a bottom surface;
first to fourth side surfaces extending between the top surface and the bottom surface; and
a screw hole passing through the top surface and the bottom surface,
wherein the top surface includes a mounting surface comprising a flat surface, and the top surface and the bottom surface are rotationally symmetric with each other,
wherein a cutting edge is formed at a junction between the top surface and the first and second side surfaces, the first and second side surfaces being adjacent to each other, wherein a non-cutting edge is formed at a junction between the top surface and the third and fourth side surfaces, the third and fourth side surfaces being adjacent to each other, wherein the first and second side surfaces form an acute angle with a plane containing the flat mounting surface of the top surface, and the third and fourth side surfaces form an obtuse angle with the plane containing the flat mounting surface of the top surface, wherein:

a first main cutting edge is formed at a junction between the top surface and the first side surface; and a first corner cutting edge is formed at a corner between the first side surface and the second side surface;

the second side surface comprises a plurality of surfaces;

a first wiper cutting edge is formed at a junction between the top surface and a surface among the plurality of surfaces of the second side surface adjacent to the first side surface;

a first oblique cutting edge is formed at a junction between the top surface and a surface among the plurality of surfaces of the second side surface adjacent to the third side surface, and wherein a second main cutting edge is formed at a junction between the bottom surface and the fourth side surface;

a second corner cutting edge is formed at a corner between the third side surface and the fourth side surface;

the third side surface comprises a plurality of surfaces;

a second wiper cutting edge is formed at a junction between the bottom surface and a surface among the plurality of surfaces of the third side surface adjacent to the fourth side surface; and a second oblique cutting edge is formed at a junction between the bottom surface and a surface among the plurality of surfaces of the third side surface adjacent to the second side surface.

7. The cutting insert of claim 6, wherein the bottom surface includes a mounting surface comprising a flat surface, wherein: the first main cutting edge is inclined downwardly from the first corner cutting edge; the first wiper cutting edge is parallel to the mounting surface of the top surface; and the first oblique cutting edge is inclined downwardly from the first wiper cutting edge, and wherein: the second main cutting edge is inclined upwardly from the second corner cutting edge; the second wiper cutting edge is parallel to the mounting surface of the bottom surface; and the second oblique cutting edge is inclined upwardly from the second wiper cutting edge.

8. The cutting insert of claim 1, wherein the first cutting edge comprises a main cutting edge and a wiper cutting edge, and wherein an angle formed between the first side surface with the main cutting edge and the second side surface with the wiper cutting edge is 85° to 95°.

9. A cutting insert, comprising:
a top surface;
a bottom surface;
first to fourth side surfaces extending between the top surface and the bottom surface; and
a screw hole passing through the top surface and the bottom surface, wherein the top surface includes a mounting surface comprising a flat surface, and the top surface and the bottom surface are rotationally symmetric with each other, wherein a cutting edge is formed at a junction between the top surface and the first and second side surfaces, the first and second side surfaces being adjacent to each other, wherein a non-cutting edge is formed at a junction between the top surface and the third and fourth side surfaces, the third and fourth side surfaces being adjacent to each other, wherein the first and second side surfaces form an acute angle with a plane containing the flat mounting surface of the top surface, and the third and fourth side surfaces form an obtuse angle with the plane containing the flat mounting surface of the top surface, wherein the first side surface comprises: a first relief surface adjacent to the top surface and comprising a convex curved surface; and a second relief surface adjacent to the bottom surface and comprising a flat surface, and wherein the fourth side surface comprises: a first relief surface adjacent to the bottom surface and comprising a convex curved surface; and a second relief surface adjacent to the top surface and comprising a flat surface.

10. The cutting insert of claim 1, wherein the top surface and the bottom surface are rotationally symmetric only with respect to a central line (Q), wherein the central line lies along a mid-plane between the top surface and the bottom surface, and wherein the central line extends through a center of a corner located between the adjacent second and third side surfaces and a center of a corner located between the adjacent first and fourth side surfaces.

11. A cutting tool, comprising:

the cutting insert of claim 1; and an insert pocket in which the cutting insert is mounted, wherein the insert pocket comprises: an insert seating surface on which the cutting insert is seated; and radial and axial support walls contacting the side surfaces of the cutting insert and supporting the cutting insert, and wherein the insert seating surface and the radial support wall form an acute angle and the insert seating surface and the axial support wall form an acute angle.

12. The cutting insert of claim 1, wherein:

the top and bottom surfaces are identical to one another;

the first and fourth side surfaces are identical to one another; and the second and third side surfaces are identical to one another.

* * * * *